United States Patent Office 3,457,233
Patented July 22, 1969

3,457,233
**PROCESS FOR PREPARING POLYOXY-
METHYLENE COPOLYMERS**
Shinichi Ishida, Horomichi Fukuda, and Shizuko Saito,
Tokyo, Japan, assignors to Asahi Kasei Kogyo Kabushiki Kaisha, Osaka, Japan, a corporation of Japan
No Drawing. Filed Dec. 23, 1964, Ser. No. 420,789
Claims priority, application Japan, Dec. 28, 1963,
38/70,493, 38/70,494; Jan. 13, 1964, 39/1,144
Int. Cl. C08g 1/18, 1/22
U.S. Cl. 260—73                                10 Claims

ABSTRACT OF THE DISCLOSURE

A process for producing a polyoxymethylene copolymer which can be used for the production of moldings having excellent properties, such as superior whiteness and thermal stability. The process comprises copolymerizing trioxane with at least one unsaturated aliphatic dicarboxylic acid selected from the group consisting of maleic anhydride, itaconic anhydride, and monochloromaleic anhydride under the influence of an ionizing radiation or a catalyst, and then preferably, reacting the resulting copolymer with at least one agent selected from the group consisting of amines, ammonia, hydrazine, phenylhydrazine, urea, ethyleneurea, diethylurea and diphenylurea.

---

The present invention relates to a process for preparing highly thermostable polyoxymethylene copolymers. The object of the present invention is to prepare polyoxymethylene copolymers which are available for the production of moldings having excellent properties such as superior whiteness and thermal stability.

It has been known that polyoxymethylenes which have recurrent units of —$CH_2O$— are prepared by polymerizing anhydrous formaldehyde by using a catalyst such as amines, onium salts, or organometallic compounds or light or ionizing rays in the presence or absence of an organic solvent, by polymerizing trioxane i.e., the cyclic trimer of formaldehyde in the presence of a catlyst such as antimony trifluoride or boron trifluoride, or by subjecting trioxane to irradiation of ionizing rays in the solid phase. However, the molded products of thus obtained polyoxymethylene are unsatisfactory in the thermal stability.

The present inventors were successful in the preparation of polyoxymethylene copolymers containing a small amount of an acid anhydride group, by polymerizing trioxane under the irradiation of ionizing rays or in the presence of a catalyst in the copresence of unsaturated aliphatic dicarboxyanhydride, and further have found that said polyoxymethylene copolymers containing these acid anhydride groups can be treated in the copresence of amines, ammonia, hydrazine, urea or derivatives thereof under gentle conditions, to obtain nitrogen-containing polyoxymethylene copolymers of much improved thermal stability.

The chains of polyoxymethylenes are decomposed due to heat, and most of this decomposition consist of degradation starting from the end of the chain. Therefore, when the chain of polyoxymethylene has a heterogeneous unit group or structure interrupting the depolymerization, the thermal stability of polyoxymethylene is increased.

The chain of polyoxymethylene, according to the present invention, has a cyclic acid anhydride unit introduced by copolymerization, so the resistance to degradation or thermal stabilization is achieved. Further, the thermal stability of polyoxymethylene copolymer is remarkably improved by treating said copolymer with an amine, ammonia, hydrazine, urea or derivatives thereof, without adversely influencing the original excellent physical properties such as high tenacity and processability of polyoxymethylene copolymer.

The unsaturated dibasic aliphatic carboxyanhydride according to the present invention includes maleic anhydride, itaconic anhydride, monochloro maleic anhydride and the like. The amount of said anhydride usually equals to 0.01–20% by weight of trioxane. It is still desirable to determine the suitable amount according to the kind of applied acid anhydride.

The copolymerization according to the present invention is carried out by the irradiation of ionizing rays or in the presence of a catalyst. It has been well-known that only trioxane in solid phase is polymerized by irradiation of the ionizing rays, and the present invention employs the conventional well-known process.

In the polymerization in solid phase, the acid anhydride is copresent with trioxane in the form of a mixture or a solid solution. A process for obtaining the state of coexistence is, for example, a mixing obtained by simple addition, fusing or using a solvent, but is not limited thereto.

Two different processes are available for the polymerization carried out by irradiation of the ionizing ray, that is, irradiation polymerization and after-effect (post) polymerization by previous irradiation. In the case of the former, the polymerization is started as soon as the irradiation is applied at a temperature from room temperature to 100° C. In case of the latter, the previous irradiation is carried out at a temperature from the temperature of a liquid nitrogen bath to room temperature and, after finishing the irradiation, the polymerization is carried out by heating at a temperature from 30° C. to the melting point of the polymerization mixture.

The ionizing rays effective for polymerization are α-ray, β-ray, γ-ray and X-ray, and preferable is the irradiation of van de Graaff and γ-ray irradition from the source of cobalt 60 with respect to convenience and easiness in practice. The irradiation amount is not especially limited, but an excess of irradiation is not desirable, because it causes the breakdown of the polymer chain. The dose rate is not limited in particular.

The copolymerization according to the present invention can be carried out not only by the action of the ionizing ray but also various catalysts. For example, a suitable catalyst for the polymerization of trioxane includes boron trifluoride, complexes thereof, antimony fluoride, sulfonic acid, sulfonate and the like, or in case of using said acid anhydride, there may be employed a very effective radical initiator of the peroxide type such as benzyl peroxide, lauryl peroxide, dibutyl peroxide, dichlorobenzoyl peroxide, acetyl peroxide, methyl ethyl ketone peroxide, cumene hydroperoxide and the like.

In the copresence of 0.01% to 5% by weight of said catalyst, in the absence or the presence of a solvent, the polymerization is carried out by heating at a temperature from 30° C. to 120° C.

A more desirable result, however, has usually been obtained in polymerization with irradiation.

The polymers thus obtained are washed and extracted with a suitable solvent such as acetone, to remove the unreacted monomer and individual polymer of said acid anhydride, and elementary analysis, infrared absorption, spectrum analysis and chemical detection have proved that said acid anhydride group is included in the structure of polyoxymethylene.

The polymer obtained according to the present invention is superior in whiteness and reaches a high degree of polymerization by selecting a suitable condition.

Furthermore, polyoxymethylenes of high moldability are obtained by esterification or etherification or other protection of the chain ends.

For increasing the thermal stability, the cyclic acid anhydride group of said polyoxymethylene copolymer is reacted with an amine, ammonia, hydrazine, a derivative thereof, urea or a derivative thereof, and the polyoxymethylene copolymer thus obtained contains an amide or imide group in case of using an amine, an amide group in the case of ammonia, and a hydrazide group in case of hydrazine.

The suitable treating agent according to the present invention includes primary or secondary, aliphatic or aromatic amines, such as methylamine, ethylamine, propylamine, butylamine, pentylamine, hexylamine, cyclohexylamine, octylamine, nonylamine, aniline, toluidine, naphthylamine, dimethylamine, dipropylamine, dibutylamine, dihexylamine, dioctylamine, N-methylaniline, ethyleneimine, propyleneimine, p-aminobenzamide and the like, ammonia, hydrazine, urea and derivatives thereof such as phenylhydrazine, ethyleneurea, diethylurea, diphenylurea, which are used under anhydrous condition or in the form of solution.

The process of the persent invention is carried out by using said treating agent below room temperature or under heating.

Moreover, it is more desirable that the polyoxymethylene copolymer subjected to said amine, ammonia or hydrazine treatment is at the same time treated with a thermal or optical stabilizer and antioxidant such as phenols, urea, optical stabilizer and antioxidant such as phenols, urea, thiourea, amines and amides, which are commonly used for polyoxymethylene polymers.

Still further, it is preferable to achieve the further stabilization by subjecting the terminal hydroxyl group to acetylation with ketene or acetic anhydride or to urethanification with isocyanate.

It is also possible to obtain a high heat resistant copolyacetal having no hydroxyl group at both ends by treating the copolymer with an amine, ammonia, hydrazine and urea without applying said treatment, and subjecting the obtained copolyacetal to heat treatment for causing the degradation of its thermally unstable portion. It has also been found that the copolyacetal thus obtained has a sufficient thermal stability for molding.

The process of the present invention is illustrated by the following examples, for the purpose of illustration only, but not limiting the invention.

EXAMPLE 1

20 g. of trioxane crystals and 1 g. of itaconic anhydride are well mixed and fused, degasified at −20° C., subjected to $1.2 \times 10^6$ of r. of dose irradiation at 0° C. in an ampule with γ-rays of $5.1 \times 10^4$ rad./hr. in dose rate from a 400 curie cobalt-60 source, and heated at 50° C. for 8 hours in a water bath. By opening the ampule, the contents are taken out, extracted sufficiently with acetone. The yield weighed 17.0 g. The product had a melting point of 175° C. and a specific viscosity of 2.2 in a 1% solution of p-chlorophenol.

After introducing 5 g. of the obtained polyoxymethylene copolymer into 30 cc. of liquid ammonia and reacting it at 50° C. for 20 hours in an autoclave, liquid ammonia was distilled off and the resultant product was sufficiently washed with benzene and dried, to yield 4.95 g. The thermal decomposition rate of this product was 0.15%/min. at 222° C.

EXAMPLE 2

9 g. of trioxane crystals and 1 g. of maleic anhydride are well mixed and fused, degasified at −20° C., subjected to $2.45 \times 10^6$ of γ-irradiation at 50° C. in an ampule with γ-rays of $5.1 \times 10^4$ rad./hr. in dose rate from a 400 curie cobalt-60 source, extracted with acetone by opening the ampule and dried. The yield was 75 g. The produce had a melting point of 160° C. and a specific viscosity of 1.80 in a 1% solution of p-chlorophenol.

5 g. of the obtained polyoxymethylene copolymer were added with 30 cc. of an aqueous solution of hydrazine, kept at 50° C. for 3 hours and cleansed with ether and alcohol, and dried. The yield was 4.96 g. The thermal decomposition rate of this product was 0.16%/min. at 222° C.

EXAMPLE 3

Introducing 3 g. of the polyoxymethylene copolymer obtained as described in Example 1 into 30 cc. of liquid ammonia, reacting the mixture at 100° C. for 20 hours in an autoclave, and distilling off liquid ammonia, the obtained product was cleansed with benzene and dried. The yield was 2.95 g. The infra-red ray absorption spectrum proved the presence of amido group and the absence of acid anhydride. The thermal decomposition rate of this product (K. 222) was 0.18%/min. at 222° C.

EXAMPLE 4

10 g. of trioxane crystals and 0.5 g. of itaconic anhydride are well mixed and fused, degasified at −20° C., subjected to $1.2 \times 10^6$ of γ irradiation at 0° C. in an ampule with γ rays of $5.1 \times 10^4$ rad./hr. from a 400 curie cobalt-60 source and heated at 50° C. for 8 hours in a water bath. The contents were taken out by opening the ampule and extracted completely with acetone at 60° C. This yield was 8.5 g. This product had a melting point of 175° C. and a specific viscosity of 2.21 in a 1% solution of p-chlorophenol at 60° C.

5 g. of the obtained copolymer were added with 100 cc. of ethyl ether, kept at 30°–50° C., under stirring added dropwise with a solution prepared by dissolving 3 g. of diethylamine in 100 cc. of diethyl ether, and stirred for 60 minutes. Then, the precipitate as filtered, well cleansed with diethyl ether and dried. The yield was 4.8 g. The thermal decomposition rate of this product (K. 222) was 0.19%/min. at 222° C.

EXAMPLE 5

10 parts of the copolymer of trioxane and maleic anhydride prepared as described in Example 1 were well mixed with 10 parts of urea and were still admixed by heating at 140° C. Then, this mixture was washed with water and dried, to yield about 10 parts of copolyacetal containing 0.37% in weight of nitrogen. This product had a thermal decomposition rate (K, 222) of 0.15% min. at 222° C. and provides a tough film in a hot press.

EXAMPLE 6

A powder copolyacetal was prepared from 50 g. of trioxane and 2.5 g. of itaconic anhydride by the irridiation of radioactive rays in the same manner as in Example 4. After 40 g. of said powder copolyacetal were added into 400 ml. of dry liquid ammonia under the isolation of moisture in an autoclave and reacted at 80° C. for 10 hours, ammonia was recovered and the product was well cleansed with diethyl ether and dried in vacuo, to yield 40 g. of white powder. The infra-red absorption spectrum proved the formation of amido group and the absence of carboxyanhydride group. The thermal decomposition rate of this product (K. 222) was 0.28% min. at 222° C.

When heating 10 g. of this product in diphenyl ether at 155°–160° C., it was 0.13%/min. at 222° C.

Further, after esterification of this product with acetic anhydride according to the normal method, it was 0.09%/min. at 222° C. Then, this product made possible the preparation of tough films by a hot press.

EXAMPLE 7

The copolyacetals of maleic anhydride and itaconic anhydride prepared in the same manner as in Examples 1 and 2 were treated with various treating agents, to obtain nitrogen-containing polyoxymethylene. These results were summarized in the following table.

| Copolymerized Charged anhydride (% wt.) | Treating agent | Treating temperature (° C.) | K. 222 of treated polyoxymethylene (percent/min.) |
|---|---|---|---|
| Maleic anhydride 2 | Phenylhydrazine | 60 | 0.20 |
| Itaconic anhydride 2 | do | 60 | 0.21 |
| Do | Ethylenediamine | 60 | 0.19 |
| Do | β-Napthylamine | 60 | 0.18 |
| Maleic anhydride 2 | Propyleneimine | 160 | 0.23 |
| Do | p-Aminobenzamide | 160 | 0.22 |
| Monochloro maleic anhydride 1 | Ammonia | 30 | 0.22 |

EXAMPLE 8

In an ampule 20 g. of trioxane and 1 g. of itaconic anhydride, and 50 ml. of methylcyclohexane, 0.01 ml. of borontrifluoride-etherate were charged. The mixture was heated at 80° C. on water bath for 12 hours. After reaction, the ampule was opened, the product was washed with methanol and warmed-acetone and then dried in vacuo. The yield was 12.5 g.

The infrared spectra of the product shows absorption bands at 1770 cm.$^{-1}$ and 1860 cm.$^{-1}$ of carboxyl group of anhydride. The product had a melting point of 173° C.

EXAMPLE 9

20 g. of trioxane and 1 g. of itaconic anhydride and 0.01 g. of benzoylperoxide are well mixed and fused in an ampule. The ampule was heated at 80° C. on water bath, for 12 hrs. After the reaction, by opening the ampule, the contents are taken out, extracted sufficiently with acetone. The yield weighed 8.2 g.

The product had a melting point of 175° C.

EXAMPLE 10

10 g. of trioxane, and 2 g. of itaconic anhydride and 0.01 g. of methyl-m-nitrobenzene sulfonate and 30 ml. of methylcyclohexane were well mixed in an ampule.

The polymerization was carried out in the same way as in Example 9. The yield was 12 g. and the product had a melting point of 172° C. The carbonyl absorption was found in the infrared spectra as in Example 8.

What is claimed is:

1. A process for preparing a polyoxymethylene copolymer, which comprises copolymerizing trioxane with at least one unsaturated aliphatic dicarboxylic acid anhydride selected from the group consisting of maleic anhydride, itaconic anhydride and monochloromaleic anhydride under the influence of an ionizing radiation, the amount of the anhydride being less than 20% by weight based on the weight of the trioxane.

2. A process for preparing a nitrogen substituted polyoxymethylene copolymer, which comprises copolymerizing trioxane with at least one unsaturated aliphatic dicarboxylic acid anhydride selected from the group consisting of maleic anhydride, itaconic anhydride and monochloromaleic anhydride under the influence of an ionizing radiation, the amount of the anhydride being less than 20% by weight based on the weight of the trioxane, and then reacting the resulting copolymer with at least one agent selected from the group consisting of amines, ammonia, hydrazine, phenylhydrazine, urea, ethyleneurea, diethylurea and diphenylurea.

3. A process according to claim 2 wherein the copolymerization is effected by subjecting the trioxane and the anhydride to an ionizing radiation at a temperature of between room temperature to 100° C.

4. A process according to claim 2 wherein the copolymerization is effected by first subjecting the trioxane and the anhydride to an ionizing radiation at a temperature between the temperature of a liquid nitrogen bath and room temperature and then heating at a temperature between 30° C. and the melting point of the polymerization mixture.

5. A process according to claim 2 wherein the reaction of the copolymer with the agent is effected under anhydrous conditions.

6. A process according to claim 2 wherein the reaction of the copolymer with the agent is effected at a temperature below room temperature.

7. A process according to claim 2 wherein the reaction of the copolymer with the agent is effected at an elevated temperature.

8. A process for preparing a polyoxymethylene copolymer, which comprises copolymerizing trioxane with less than 20% by weight based on the weight of trioxane of at least one unsaturated aliphatic dicarboxylic acid anhydride selected from the group consisting of maleic anhydride, itaconic anhydride, and monochlormaleic anhydride in the presence of 0.01 to 5% by weight of a catalyst selected from the group consisting of boron trifluoride, complexes of boron trifluoride, antimony fluoride sulfonic acid, sulfonates, benzoyl peroxide, lauryl peroxide, dibutyl peroxide, dichlorobenzoyl peroxide, acetyl peroxide, methylethyl ketone peroxide, and cumene peroxide, and then reacting the resulting copolymer with at least one agent selected from the group consisting of amines, ammonia, hydrazine, phenylhydrazine, urea, ethyleneurea, diethylurea, and diphenylurea.

9. A process according to claim 8 wherein the copolymerization is effected at a temperature between 30° and 120° C. and the reaction of the copolymer with the agent is effected at a temperature below room temperature.

10. A process according to claim 8 wherein the copolymerization is effected at a temperature between 30° and 120° C. and the reaction is effected at an elevated temperature.

References Cited

UNITED STATES PATENTS

| 3,347,764 | 10/1967 | Matsumoto et al. | 204—159.21 |
| 3,372,145 | 3/1968 | Okamura et al. | 260—67 |
| 3,326,857 | 6/1967 | Kawasumi et al. | 260—67 |
| 3,394,107 | 7/1968 | Wakasa et al. | 260—67 |
| 3,309,296 | 3/1967 | Fukui et al. | 204—159.21 |
| 3,326,857 | 6/1967 | Kawasumi et al. | 260—73 |
| 2,371,990 | 3/1945 | Hanford | 260—67 |
| 3,196,098 | 7/1965 | Mochel | 204—158 |
| 3,252,940 | 5/1966 | Mantell | 260—73 |

JAMES A. SEIDLECK, Primary Examiner

J. C. HAIGHT, Assistant Examiner

U.S. Cl. X.R.

204—159.21; 260—67

UNITED STATES PATENT OFFICE
CERTIFICATE OF CORRECTION

Patent No. 3,457,233                                           July 22, 1969

Shinichi Ishida et al.

It is certified that error appears in the above identified
patent and that said Letters Patent are hereby corrected as
shown below:

In the heading to the printed specification, line 4,
"Horomichi Fukuda" should read -- Hiromichi Fukuda --.

Signed and sealed this 20th day of October 1970.

(SEAL)
Attest:

Edward M. Fletcher, Jr.                    WILLIAM E. SCHUYLER, J
Attesting Officer                                Commissioner of Patent